Sept. 17, 1935. G. MABBOUX 2,014,688
PROCESS AND DEVICE FOR THE APPLICATION OF ELASTICIMETRY,
PARTICULARLY OF PHOTOELASTICIMETRY
Filed Nov. 5, 1931 4 Sheets-Sheet 1

Inventor:
Georges Mabboux

Sept. 17, 1935.                G. MABBOUX                2,014,688
        PROCESS AND DEVICE FOR THE APPLICATION OF ELASTICIMETRY,
                    PARTICULARLY OF PHOTOELASTICIMETRY
                        Filed Nov. 5, 1931          4 Sheets-Sheet 2
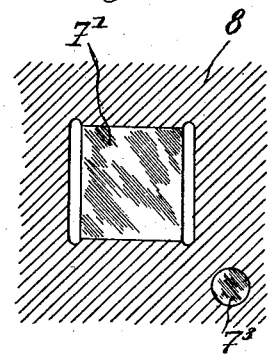
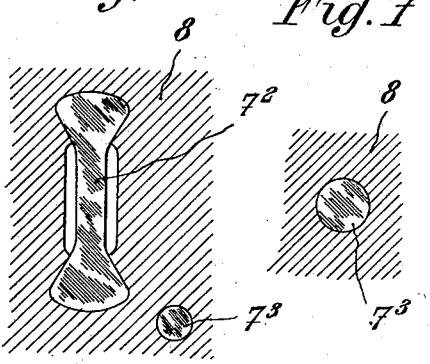
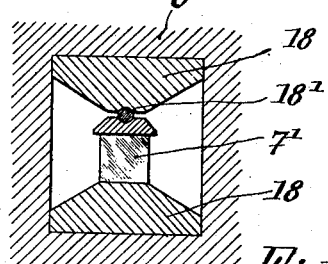
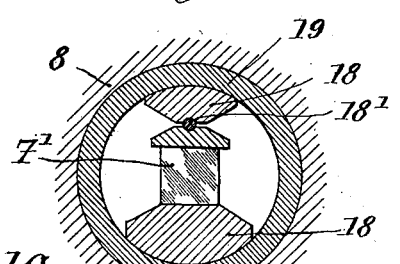
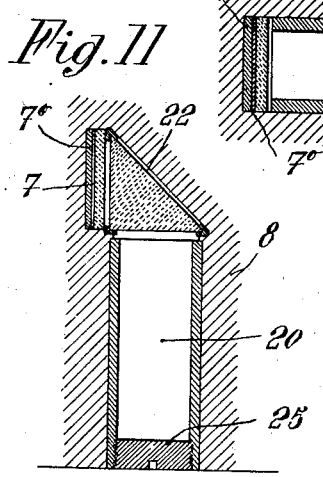
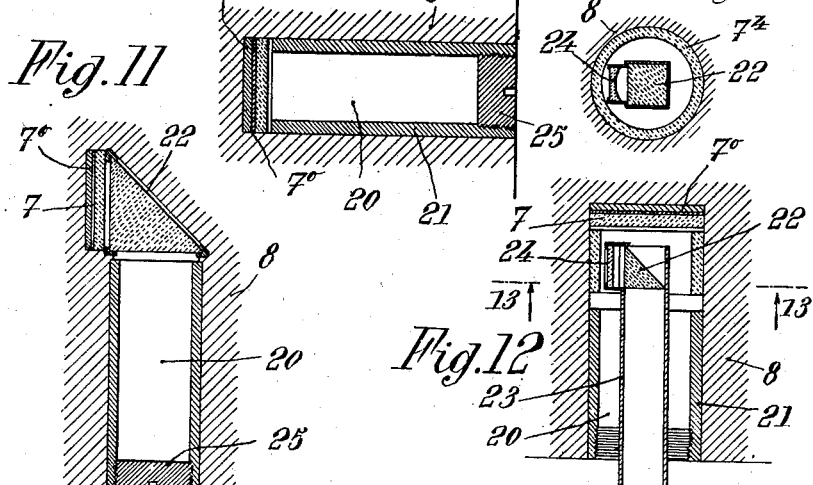

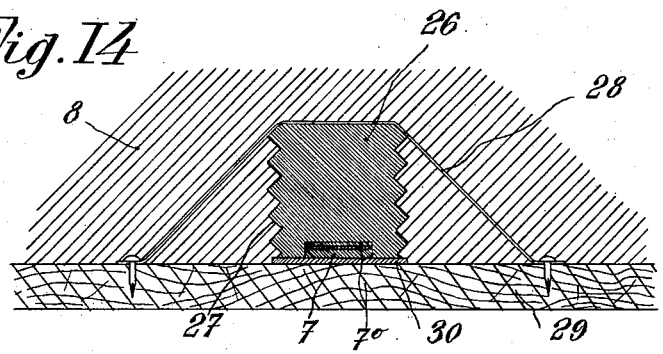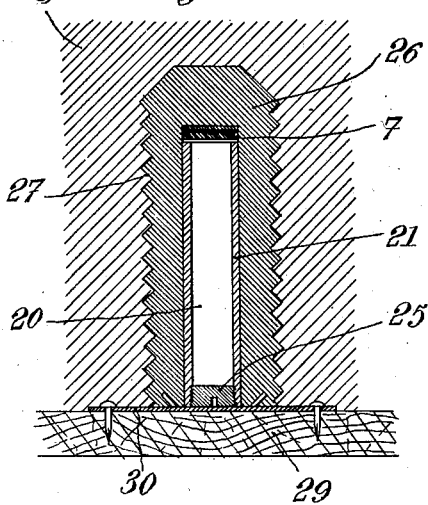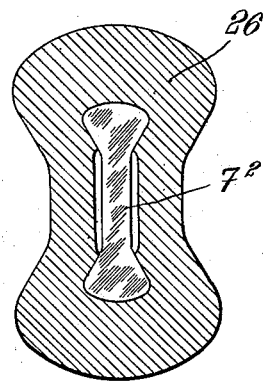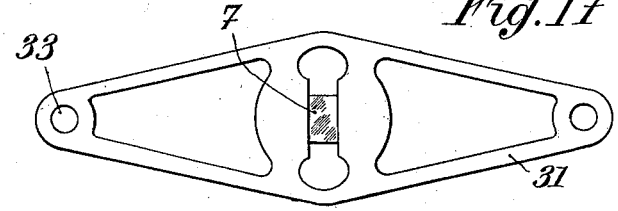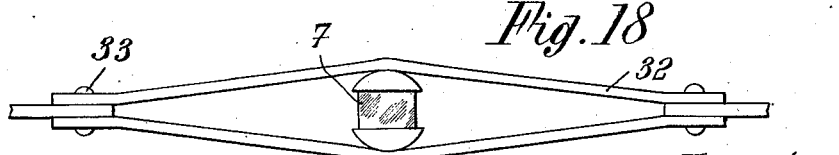

Patented Sept. 17, 1935

2,014,688

UNITED STATES PATENT OFFICE 2,014,688

PROCESS AND DEVICE FOR THE APPLICATION OF ELASTICIMETRY, PARTICULARLY OF PHOTOELASTICIMETRY

Georges Mabboux, Paris, France

Application November 5, 1931, Serial No. 573,216
In Belgium November 10, 1930

11 Claims. (Cl. 88—14)

The invention relates to processes and devices for the measurement of strains which opaque bodies undergo.

Its main object is to give these processes and devices, whatever they be, a more general application, whilst being simpler to operate and more efficacious.

The invention will, at all events, be well understood with the aid of the following description as well as of the accompanying drawings, which description and drawings are, of course, given only by way of example.

Figs. 5, 6 and 7 respectively show in elevation, three different arrangements in which the responsive elements are fixed on the surface of the body, the strains of which it is desired to determine.

Figs. 8 and 9 respectively show two modifications of the arrangement according to Fig. 5.

Figs. 10 and 11 respectively show, in longitudinal section, two different arrangements in which responsive elements are fixed in the mass of the body, the strains of which it is desired to determine.

Figs. 12 and 13 show, in longitudinal section and in transverse section on the line 13—13 of Fig. 12, respectively a modification of the arrangement shown in Fig. 11.

Figs. 14, 15 and 16 respectively show, in longitudinal section, three different elements adapted to be fixed in a work in concrete or in masonry.

Figure 19:
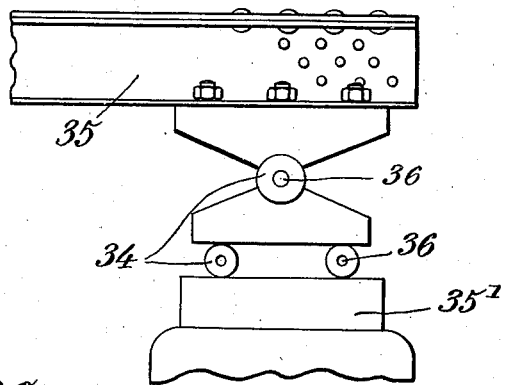

Figs. 17, 18 and 19 respectively show, in elevation, three different elements adapted to be inserted in an iron work of art.

Figures 20, 21:
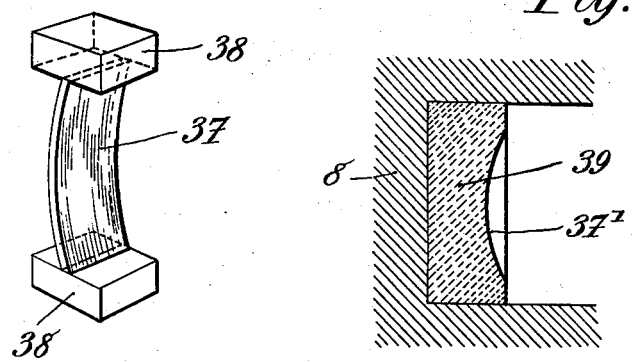

Figs. 20 and 21 show diagrammatically two different responsive elements.

Figure 22:
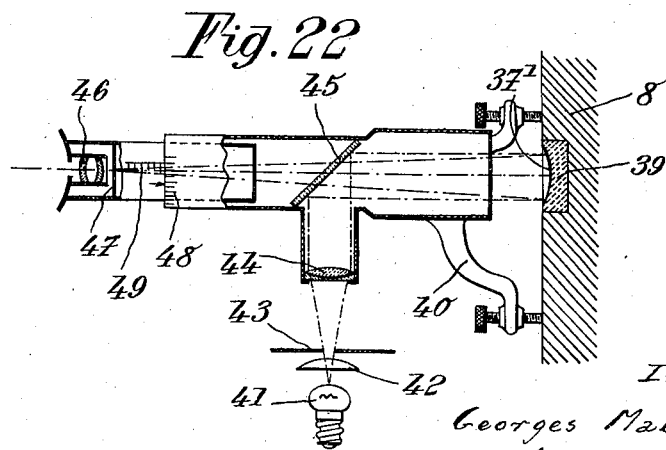

Fig. 22, finally, shows, in a diagrammatic side view, a measuring instrument applicable in this latter case.

The work of art in question is given, for example at the positions in which the mechanical strains are the most important or most dangerous, elements which are elastically responsive. The connection between these elements and the material of which the work is composed should be made as trustworthy as possible. On the other hand, the disturbances in the surrounding state of equilibrium which result therefrom are reduced to a minimum by giving the said elements very small dimensions in relation to the portion of the work to be studied.

The elastically responsive elements may be formed by deformable reflecting surfaces and their deformations under the action of the strains are observed.

The elastically responsive elements may also be made of a transparent material, for example of borosilicated glass, bakelite, celluloid etc. These elements may be lodged in a passage crossing the object to be studied from one side to the other, thus permitting the observation to be made by transparency. In the case in which this presents inconveniences or impossibilities, this is remedied by coacting the transparent element with a reflecting surface which enables the observation to be made by reflection.

The responsive elements hereinbefore mentioned may be fixed to the surface of the object to be studied or lodged in the mass constituting this object, a direction of access being then kept for them.

In many cases it may be admitted that the strains, indicated by changes in the shape or in the physical properties (double refraction) of the responsive elements, are related by simple functions to the forces acting upon the object to be studied. In the directions in which the principal strains (these directions always forming a right-angled system between themselves) act are known approximately, the responsive elements may be arranged in such a manner that each of them is subjected to only one of these strains (by compression or tension) to the exclusion of the others.

The apparatus which enables measurement to be made of the changes undergone, under the action of the strains, by the responsive elements fixed at different points of the work, must necessarily be constituted by an independent set, which is easily transportable and manageable and easy to set in different directions. It should, moreover, be able to be supported on the work in order that one should be able to take the different observations with ease whatever be the position in which the element to be studied is located.

Such an apparatus is shown, by way of example, by Figs. 1 to 4, this apparatus being more especially adapted for transparent elements coated with a reflecting surface.

It comprises a stand 1, the regulatable points of support of which are preferably located in a plane that is perpendicular to the axis of an observing instrument 2. In the latter there are fixed an eyepiece 3, an analyzer 4 formed by a Glazebrook prism for example, a mirror without silvering or Brewster plate 5 and a compensating dynamometer 6. The set thus constituted can be brought in front of a mirror 7 embedded in the material 8 of the work to be studied. This mirror is illuminated with polarized light obtained, by reflection from the plate 5, of a beam of light emanating from a source 9 advantageously fed by a dry battery 10 of small dimensions. The beam emanating from this source can initially be distributed by a diffusing screen 11. The rays sent out by the mirror 7 again traverse the transparent material that it comprises and they may, after passing through the analyzer, be observed through the eyepiece 3. In the case in which it is desired to have a very powerful illumination, there may be fixed, in the path of the light rays, lenses or condensers such as 12 and 13 which produce an image of the source in the plane of the eyepiece. The compensator 6 is formed by a transparent screen of the same material as the mirror 7 and acted upon, by tension or by compression with the aid of a calibrated spring 14 and the screw 15 with a graduated barrel, in a direction in which one arrives, by acting on the said screw 15, at compensating the double refraction effect of the mirror 7. This enables the strain to which the mirror 7 is subjected to be measured by referring to the graduated scale on the screw 15.

Figure 1:
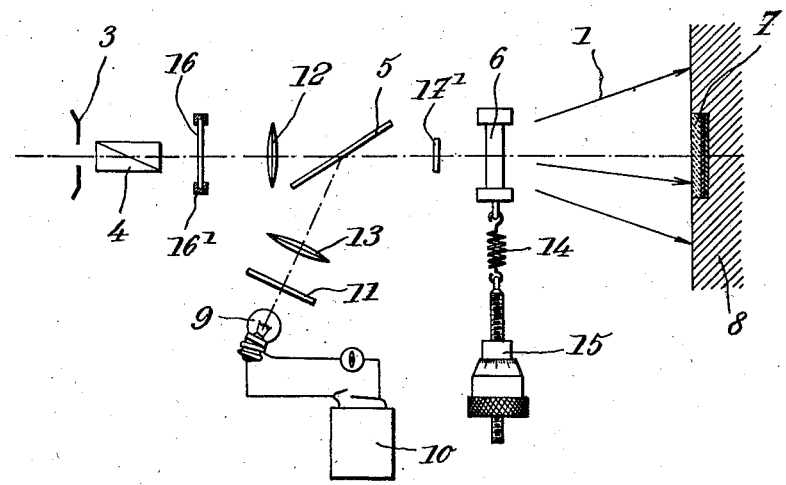
Fig. 1 shows the optical diagram of an instrument made in accordance with the invention.
Figure 2:
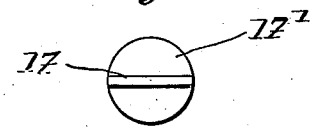
Fig. 2 shows a detail of this instrument on a larger scale and in elevation.
Figure 3:
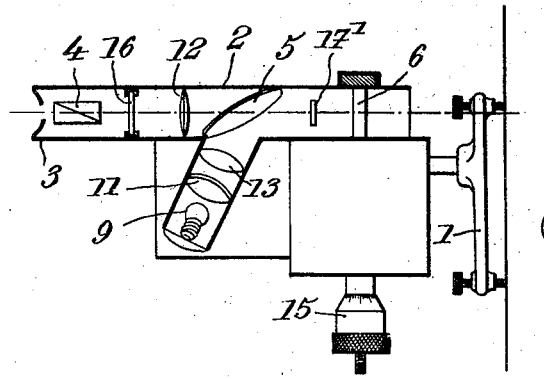
Fig. 3 and 4 show the same instrument in side view and in elevation respectively.
Figure 4:
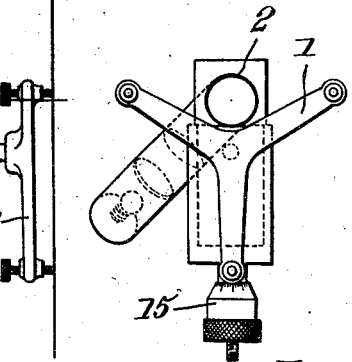

The observation can be made by having recourse to a "sensitive tint" plate, for example by placing, between the analyzer 4 and the Brewster mirror 5, a transparent screen 16, of mica for example, of suitable thickness and set in a suitable direction. This plate is engaged in a slide 16', which can also serve as a mount for any other polariscopic accessory. In this case it is advantageous to have recourse to a mark of "sensitive" tint fixed in front of the compensator and in the path of the polarized light emanating from the plate 5, this mark being formed, as shown in Fig. 2, by a band 17 of reflecting material covering only a part of the field and supported by a transparent screen 17¹ and this band sending to the observer the "sensitive" tint independently of the strains to which the mirror 7 on the one hand and the compensator 6 on the other hand are subjected.

In the case in which the double refraction effects are small or determinable with difficulty with the aid of a compensator of the kind indicated above, the latter may be replaced by a comparator formed by a transparent plate coated with a reflecting surface and behaving in the same manner as the mirror 7. This comparator is subjected to the actions of a dynamometer similar to the one indicated above and enables the polariscopic measurement to be effected by comparison of the double refraction effects observed in the said mirror 7 and in the said plate or by comparison between the "decreasing" tint of the strained element with the "increasing" tint of the comparison plate acted upon solely by the dynamometer.

In the case in which the strains manifest themselves in a vertical plane, the optical system may comprise a plummet enabling the setting of the planes of polarization of the optical instrument, in relation to the vertical, to be marked at the proper instant. As far as concerns the setting in a horizontal plane, this can easily be determined with the aid of a compass or the like also provided with a blocking device. The stand 1 may also be mounted on a support enabling said stand to turn relatively to the optical axis of the instrument in order to measure the rotation of the planes of principal strains.

Measurements carried out in this way can give immediately the value of the difference of the principal strains of the mirror but the sum of these cannot be obtained except by laborious processes. It is therefore advantageous to give one of the principal strains a known value, for example zero. This result is obtained by giving the mirror 7 a form that comprises a substantially rectangular region, two opposite sides of this region being acted upon by compression (Fig. 5) or by tension (Fig. 6) whilst the two other sides are free.

In the case in which the direction of the principal strains is known, a rectangular mirror 7¹ (Fig. 5) may be arranged so that its free sides are parallel to the compression component. There can likewise be arranged near this responsive element a mirror 7² in the form of a tension gauge (Fig. 6), the longitudinal sides of which are free. These two mirrors thus enable the two principal strains prevailing in a certain place in the work to be measured.

A circular mirror 7³ (Fig. 7) enables the respective directions of the principal strains to be found when these directions are totally unknown at the beginning. It also enables the value of the strains to be found in some cases in which the problem is particularly simple. It is, besides, advantageous, to fix such a circular mirror 7³ near the mirrors 7¹ or 7² shown in Figs. 5 and 6. This combination, on the one hand, enables the setting of the principal axes of the elastic ellipse to be known, and, on the other hand, enables the size of the two diameters of the ellipse parallel to the direction of setting of the responsive element to be determined, the ellipse being thus entirely ascertained.

The reflecting part of the mirror 7 may be out of contact with the mass to be studied, a free space being left behind the said part or an elastic or very compressible pad, such as 7ᶜ shown in Figs. 10 to 12, being inserted.

When the difference between the coefficients of elasticity of the materials forming the mirror and the mass acting upon it respectively is deemed to be too great, the responsive element can be given in a given direction a mean coefficient of elasticity, chosen arbitrarily between certain limits, by having recourse to the device shown in Figs. 8 and 9, in which the mirror 7¹ is finished off by shoulders 18 which distribute the reaction over a larger surface. A movable joint 18¹ fixed between one of these shoulders and the mirror 7¹ avoids bending moments. If the whole is consolidated by being encircled by a ring 19 (Fig. 9) it may be given a transverse coefficient of elasticity, different from zero.

When it is desired to measure the strains not on the surface but within the mass itself of the body to be studied, recourse may be had to a mirror 7 placed transversely at the bottom of a hole or passage 20 (Fig. 10). In order to reduce the disturbance of the equilibrium to a minimum, the empty space thus created may be filled with a transparent material, such as Pokels' flint, insensible to the strains. The wall of the said hole or passage may alternatively be reinforced by a tube 21, of steel for example, the thickness of which is best chosen in accordance with the relationship between the elastic coefficients of the materials present. In the case of structures of concrete or of iron, one of the reinforcements or portion of the ironwork, generally formed by a solid metallic rod, may be replaced by a tube in which the responsive element is fixed.

In order to ascertain the tensions in different planes that are not perpendicular to the axis of the said passage 20, recourse may be had to an auxiliary reflecting element which is insensible to the forces. This element may, for example, be formed by a mirror made of inoxidizable steel, a total reflection prism 22 made of Pokels' flint (Fig. 11) etc. It may be made a fixture opposite the mirror 7 or may be introduced into the passage when taking the measurement, by being fixed to the end of a tube 23 which can be joined to the part 2 of the measuring instrument (Figs. 1 to 4).

There may likewise be fixed at the bottom of the passage 20 a plurality of differently set mirrors or even a cylindrical mirror $7^4$ (Figs. 12 and 13) formed by a piece of transparent tube which is observed through a cylindrical lens 24 carried by the tube 23 oposite the reflecting element. The hole or passage 20 may be closed by a stopper 25 when it is not in use. In the industrial or experimental works, one may, in practice, meet with difficulties in obtaining an intimate connection between the mirrors 7 and the plastic materials (concrete, cement etc.) forming the work to be studied. It is, therefore, preferable to prepare, in the laboratory, blocks 26 of ample dimensions in which the responsive elements or mirrors 7 are embedded. These blocks have on their external surface corrugations or deep striations 27 in order to ensure a good union with the work (Figs. 14 and 15). This union is further accentuated by the shape of the blocks in the case of elements acted upon by tension (Fig. 16). When the work is being constructed, these blocks are fixed by simple means (wires 28 in Fig. 14, removable plates in Fig. 15) to the framing 29 with the interposition of sheets 30 of paper or cardboard in order to prevent the deterioration of the elastically responsive elements 7.

To make allowance for the effects of the shrinkage of the cement and of the variations in the temperature, test pieces may be made of concrete of the same composition as the work to be studied and of suitable dimensions, and responsive elements be fixed in these pieces in the same manner as in the work and adapted to be permanently subjected to substantially identical actions.

For experiments of long duration, the silvering of the mirrors may be replaced by a platinization or by an independent reflecting surface of non-oxidizable metal.

In the case of works in masonry, certain elements of construction (hewn stones, etc.) may be replaced by blocks of the same shape made of mortar having elastic properties that are as near as possible to those of the element under consideration, these blocks being prepared in advance with their elastically responsive elements 7.

In the case of metallic works, there may be permanently inserted, in the structure, elastic members such as 31 or 32 (Fig. 17 or 18) having responsive elements 7, these members being arranged so as to have the necessary freedom at the places where they are joined to the structure; this may be obtained by ensuring their union by the intermediary or bolts 33 or the like. These members are, besides, fixed so as to act with a reduced force on the responsive elements, i. e., they themselves bear nearly the whole of the actions of compression (Fig. 17) or of tension (Fig. 18).

Fig. 19 shows an interesting application of the invention to the study of strains which may be undergone by the expansion and articulation rollers 34 of supports 25 of structures such as bridges. In this case it is sufficient to make axially in each or some of the said rollers 34 a passage 36 serving to lodge a responsive element of the kind indicated above. It is to be noted that in this case the interpretation of the measurement made is particularly simple. This arrangement also constitutes an example of the case in which the observation takes place by transparency without leading to any appreciable disturbance of the stability of the whole.

Recourse may also be had, according to the invention, to application of the simpler processes by fixing, in the place of responsive elements 7, slightly curved (Fig. 20) or concave (Fig. 21) or convex reflecting elements, which, under the action of strains, undergo deformations or, more especially, changes in their curvatures. The measurement of these changes enables the actions coming into play to be determined.

In Fig. 20, the reflecting responsive element is formed by a metallic plate 37 suitably set and fixed between two pieces 38, embedded in the mass to be studied, in such a manner that the deformations of the said plate under the action of the strains will in no way be hindered. In Fig. 21, the responsive element is formed by a block 39, the active reflecting surface $37^1$ of which is concave (or convex), this block being directly subjected to the action of the strains. The responsive elements may also be formed by discs with a spherical surface or by areas of the material to be studied which have been rendered reflecting. The latter case is especially advantageous in cases of machine members or test pieces.

Fig. 22 shows a measuring instrument applicable to this case. It comprises essentially a supporting stand 40, a source of light 41 provided with a condenser 42 and a diaphragm 43 the reticule of which is preferably cruciform. The beam emanating from this source is made parallel by its passage through an objective lens 44 and directed in the direction of the central normal to the reflecting surface $37^1$ by the intermediary of a transparent mirror 45. The reflecting surface that is supposed to be concave converts this parallel beam into a convergent, generally astigmatic, beam and this beam gives images of the reticule 43 which images can be observed through the eyepiece 46. In the focal plane of this eyepiece a likewise cruciform reticule 47 is placed. Two scales, one 48, for angles, in the plane of the reticule and the other 49, linear, in the direction of the axis of the telescope, enable the characteristics of the astigmatic convergent beam to be determined and from these it is easy to reduce the deformations of the mirror and, consequently, the strains to which the latter is being subjected.

If the reflecting surface is supposed to be convex, the optics of the apparatus are changed to enable virtual images due to the divergent beam to be observed.

In the case in which it is desired to substitute, for the virtual observation, photographic or even chrono-photographic registration, it is sufficient to replace the eye by a suitable photographic or chrono-photographic apparatus. Chrono-photography can also be carried out with the aid of an intermittent source of light.

Stroboscopy can also find its application to the above indicated methods, especially in the case of the study of objects subjected to vibratory strains. It is then sufficient to have recourse to a stroboscopic apparatus fixed between the instrument and the eye or more simply, to a source of light which is itself stroboscopic (neon lamps, for example).

It has hereinbefore been supposed that the observations are made on the normal scale and the distance of normal sight. It is obvious that there may be combined, with the methods and with the apparatus indicated above, means enabling:

A microscopic observation to be made, for example, in the case of the study of the distribution of the strains and of the deformations between the elements of a micro-metallographic preparation or in the case of the observation of stationary vibrations of short wave length in the bodies subjected to examination, or an observation at a great distance, especially by telescopic means, for example in the case of the study of variations of strains during the experimental destruction of a work, in which case the observer and the measuring instrument should be free from the danger that may result from this destruction or in the case in which observation at a short distance has become impracticable or difficult.

As a result of this, means are obtained which allow to be measured in a simple, convenient and efficacious manner, the strains acting upon various parts of a body and, more especially, of an artificial structure, subjected to static and dynamic forces during its setting up, on its being finished, and for long years after being put to use. They also render possible an expert report to be made, in the case where the work would cause anxiety, with a minimum of expense because the measuring apparatus is not joined to the responsive elements and the latter are of a not very high cost price. It is to be noted that the presence of these elements does not appreciably disturb the elastic equilibrium of the whole, since a mirror with a surface of about one square millimeter is sufficient for exact measurements.

What I claim is:—

1. The method of measuring stresses in a structure comprising the steps of embedding a light reflecting element, having double refractive properties when subjected to stresses, in said structure so that stresses in the latter are communicated to said element, said element having at least one surface exposed, projecting a beam of polarized light on said element, and measuring modifications in the reflected polarized light beam due to the double refractive effect of said element, whereby stresses in said structure communicated to said element may be detected and measured.

2. The method of measuring the stresses in a structure comprising the steps of inserting a reflecting element, having a curved surface and double refractive properties when subjected to stresses, in said structure so that stresses in said structure are communicated to said element, projecting a light beam on the curved surface of said element, and measuring the angle of rotation of the plane of polarization of the light beam reflected from said element, whereby stresses in said structure communicated to said element may be detected, measured and compared.

3. The method of measuring stresses in a structure comprising the steps of embedding a reflecting element, having double refractive properties when subjected to stresses, in said structure so that stresses in the latter are communicated to said element, said element having at least one surface exposed, subjecting said structure to stress, projecting light on said element, and measuring the angle of refraction of light reflected from said element in at least two different planes, whereby stresses in said object communicated to said element may be detected and measured both as to quantity and direction.

4. In combination with an object subjected to stress, a light reflecting element immovably embedded in said object and having double refractive properties when subjected to stresses, said reflecting element being elastically responsive to the stresses in said object, means for projecting polarized light on said reflecting element, and means for measuring the effect of said element on the light.

5. In combination with a structure subjected to stresses and having a cylindrical opening formed therein, a light permeable tube formed of material having double refractive properties when subjected to stress mounted in said cylindrical opening and in contact with the walls thereof, the outer surface of said tube being light reflective, means for projecting a beam of polarized light onto the inner wall of said tube, and means for measuring the effect of said tube on the polarized light passed therethrough.

6. A method of measuring stresses in a structure comprising embedding in said structure, to receive stresses set up therein, a transparent element the double refractive property of which varies relative to the stresses applied thereto, passing a beam of polarized light through said element, reflecting the beam back through said element, and determining the effect of the element on said beam of polarized light.

7. A method of measuring stresses in a structure comprising providing a bore in said structure, positioning in said bore a transparent element, the double refractive property of which varies relative to stresses applied thereto, providing contact between opposite sides of said element and the wall of said bore to transmit stresses in said structure, in a direction parallel to a line passing through the points of contact of said element with said bore, to said element, passing a beam of polarized light through said element, reflecting the beam back through said element, and determining the effect of the element on said beam of polarized light.

8. A method of measuring stresses in a structure comprising providing a bore in said structure, positioning in said bore a transparent element, the double refractive property of which varies relative to stresses applied thereto, providing contact between opposite sides of said element and the wall of said bore to transmit stresses in said structure, in a direction parallel to a line passing through the points of contact of said element with said bore, to said element, positioning a second element in another bore in the structure to respond to stresses at substantially 90° to those received by the first element, passing polarized light through said elements, and measuring the effect of each element on the polarized light.

9. A method of measuring stresses in a structure comprising providing a bore in said structure, positioning in said bore a transparent element, the double refractive property of which varies relative to stresses applied thereto, providing contact between opposite sides of said element and the wall of said bore to transmit stresses in said structure, in a direction parallel to a line passing through the points of contact of said element with said bore, to said element, positioning a second element in another bore in the structure to respond to stresses at substantially 90° to those received by the first element, passing polarized light through said elements, reflecting the polarized light back through each element, and measuring the effect of the elements on the polarized light.

10. In combination with a structure subject to stresses having a recess formed therein, a transparent element positioned therein and exhibiting double refraction when subjected to stresses, said element being in contact with the walls of said recess to receive stresses in said structure, means for passing polarized light through said element, a reflecting surface positioned in said recess to receive light passed through said element and reflecting the same back through the element, and means for measuring the effect of said element on the polarized light.

11. In combination with a structure subjected to stresses, a transparent element formed of material having double refractive properties when subjected to stresses embedded in said structure for receiving stresses corresponding to those received by the structure, said element having a light reflective surface, means for projecting a beam of polarized light through said element onto the reflective surface, and means for measuring the degree of rotation of the plane of polarization of the reflected light.

GEORGES MABBOUX.